US009280697B2

(12) United States Patent
Gozzini et al.

(10) Patent No.: US 9,280,697 B2
(45) Date of Patent: Mar. 8, 2016

(54) AUTHENTICATION DEVICE INCLUDING TEMPLATE VALIDATION AND RELATED METHODS

(75) Inventors: Giovanni Gozzini, Berkeley, CA (US); Vladimir Lieberzeit, Prague (CZ)

(73) Assignee: APPLE INC., Cupertino, CA (US)

( * ) Notice: Subject to any disclaimer, the term of this patent is extended or adjusted under 35 U.S.C. 154(b) by 303 days.

(21) Appl. No.: 13/297,638

(22) Filed: Nov. 16, 2011

(65) Prior Publication Data

US 2013/0121542 A1 May 16, 2013

(51) Int. Cl.
G06K 9/00 (2006.01)
G06K 9/62 (2006.01)

(52) U.S. Cl.
CPC .......... *G06K 9/0012* (2013.01); *G06K 9/00926* (2013.01); *G06K 9/00973* (2013.01); *G06K 9/629* (2013.01)

(58) Field of Classification Search
CPC .......... G06K 9/00026; G06K 9/00087; G06K 9/00013; G06K 9/00073; G06K 9/00067; G06K 9/00006; G06K 9/0008; G06K 9/001; G06F 21/32; G06F 21/31; H04L 63/0861
USPC ................................................. 382/124, 125
See application file for complete search history.

(56) References Cited

U.S. PATENT DOCUMENTS

| | | | |
|---|---|---|---|
| 5,953,441 A | 9/1999 | Setlak | |
| 6,289,114 B1 | 9/2001 | Mainquet | |
| 6,292,576 B1 * | 9/2001 | Brownlee | 382/124 |
| 7,333,638 B2 * | 2/2008 | Chisamore | G06K 9/00073 382/124 |
| 7,361,919 B2 | 4/2008 | Setlak | |
| 7,519,558 B2 | 4/2009 | Ballard et al. | |
| 7,522,751 B2 | 4/2009 | White et al. | |
| 7,707,433 B2 | 4/2010 | Rice et al. | |
| 2007/0245141 A1 | 10/2007 | O'Keeffe et al. | |
| 2008/0080750 A1 | 4/2008 | Bee et al. | |
| 2008/0123909 A1 * | 5/2008 | Kim et al. | 382/125 |
| 2009/0010503 A1 * | 1/2009 | Mathiassen et al. | 382/125 |
| 2009/0016573 A1 * | 1/2009 | McAfee et al. | 382/115 |
| 2010/0158327 A1 | 6/2010 | Kangas et al. | |

OTHER PUBLICATIONS

Bazin et al: "An Investigation of Minutiae Template Interoperability", Automatic Identification Advanced Technologies, 2007 IEEE Workshop on, IEEE, Jun. 1, 2007, pp. 13-18.

* cited by examiner

*Primary Examiner* — Kim Vu
*Assistant Examiner* — Michael Vanchy, Jr.
(74) *Attorney, Agent, or Firm* — Allen, Dyer, Doppelt, Milbrath & Gilchrist, P.A.

(57) ABSTRACT

An authentication device may include a housing and a finger sensor carried by the housing and including first processing circuitry and a finger sensing area coupled thereto. The first processing circuitry may be configured to generate finger image data based upon a finger positioned adjacent the finger sensing area, and generate and store a first template based upon the finger image data. The authentication device may include second processing circuitry carried by the housing and configured to obtain the finger image data from the first processing circuitry. The second processing circuitry may be configured to generate a second template based upon the finger image data. The first processing circuitry may further be configured to obtain the second template from second processing circuitry, and validate the second template against the first template.

23 Claims, 3 Drawing Sheets

AUTHENTICATION DEVICE INCLUDING TEMPLATE VALIDATION AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., is widely used in a variety of notebooks, desktops and PC peripherals. Other fingerprint sensors, for example, the AES850, also from AuthenTec, Inc. of Melbourne, Fla., is a sensor used on smartphones.

Where a fingerprint sensor is integrated into an electronic device or host device, for example, as noted above, it may be desirable to determine whether acquired fingerprints were acquired from a live user. Additionally, it may be desirable to determine whether such fingerprints were not tampered with or substituted. Determining tampering or substitution may be increasingly difficult when a fingerprint sensor is integrated in a host device, such as a personal computer or cellphone.

SUMMARY OF THE INVENTION

In view of the foregoing background, it is therefore an object of the present invention to provide an authentication device for validating a live finger.

This and other objects, features, and advantages in accordance with the present invention are provided by an authentication device that may include a housing and a finger sensor carried by the housing. The finger sensor may include first processing circuitry and a finger sensing area coupled thereto. The first processing circuitry may be configured to generate finger image data based upon a finger positioned adjacent finger sensing area, and generate and store a first template based upon the finger image data, for example. The authentication device may further include second processing circuitry carried by the housing and configured to obtain the finger image data from the first processing circuitry, and generate a second template based upon the finger image data. The first processing circuitry may further be configured to obtain the second template from the second processing circuitry, and validate the second template against the first template, for example. Accordingly, the authentication device may validate a live finger and be resistant to tampering or substitution.

The authentication device may further include a communications channel interface carried by the housing and coupled to the second processing circuitry. The second processing circuitry may be further configured to send the second template via the communications channel interface based upon validation of the second template against the first template, for example.

The communications channel interface may include a wireless transceiver. The communications channel interface may further include encryption circuitry coupled to the wireless transceiver, for example.

The finger sensor may include a finger sensing integrated circuit module. The first template may be less processing intensive than the second template, for example.

The first template may be based upon fingerprint minutiae extracted from the finger image data by the first processing circuitry. In other words, the fingerprint minutiae may be extracted from the finger image data using a first algorithm. The second template may also be based upon fingerprint minutiae extracted from the image data by the second processing circuitry, for example. In other words, the fingerprint minutiae may be extracted from the finger image data using a second algorithm. The second template may include a Minutiae Interoperability Exchange (MINEX) template.

The authentication device may further include at least one input device and a display each carried by the housing. The second processing circuitry may include a host processor coupled to the at least one input device and the display, for example.

A method aspect is directed to an authentication method for an authentication device that may include a housing, a finger sensor carried by the housing and including first processing circuitry and a finger sensing area coupled thereto, and second processing circuitry carried by the housing. The method may include generating, via the first processing circuitry, finger image data based upon a finger positioned adjacent the finger sensing area. The method may further include generating and storing, via the first processing circuitry, a first template based upon the finger image data. The method may also include obtaining, via the second processing circuitry, the finger image data from the first processing circuitry and generating, via the second processing circuitry, a second template based upon the finger image data. The method may further include obtaining, via the first processing circuitry, the second template from the second processing circuitry and validating, via the first processing circuitry, the second template against the first template.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
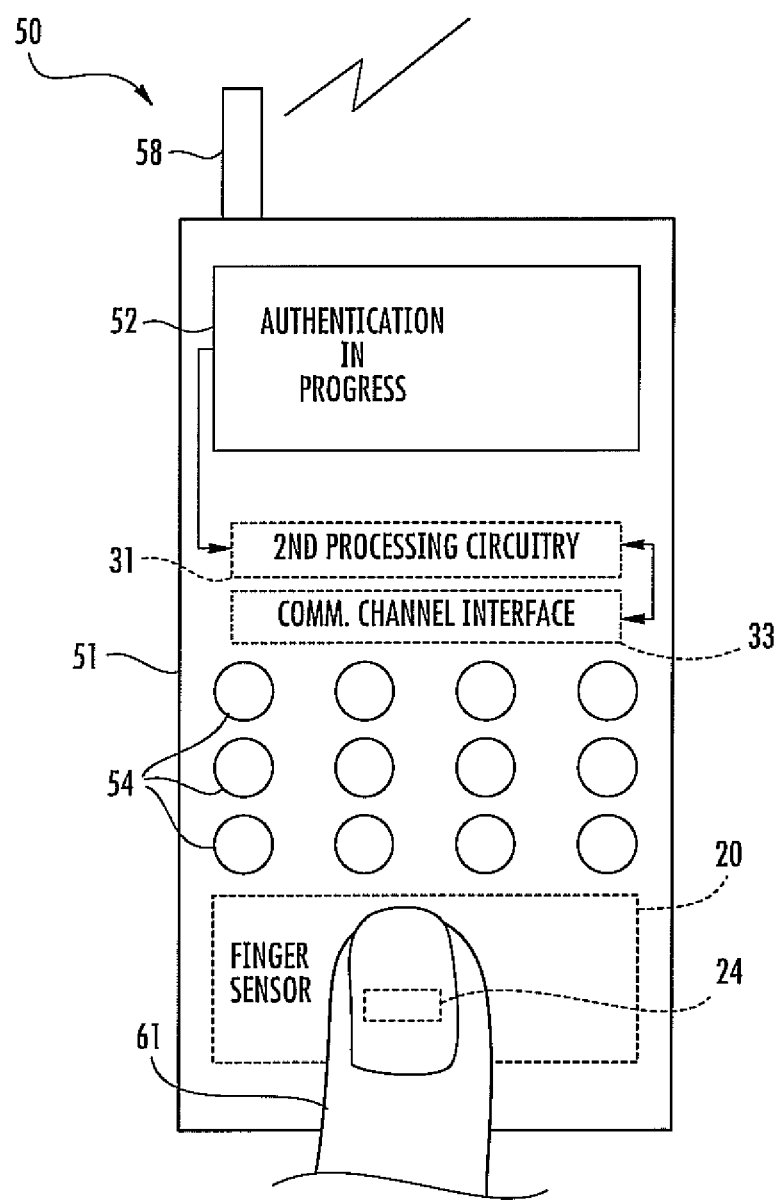
FIG. 1 is a schematic plan view of an authentication device including an authentication device in accordance with the present invention.
Figure 2:
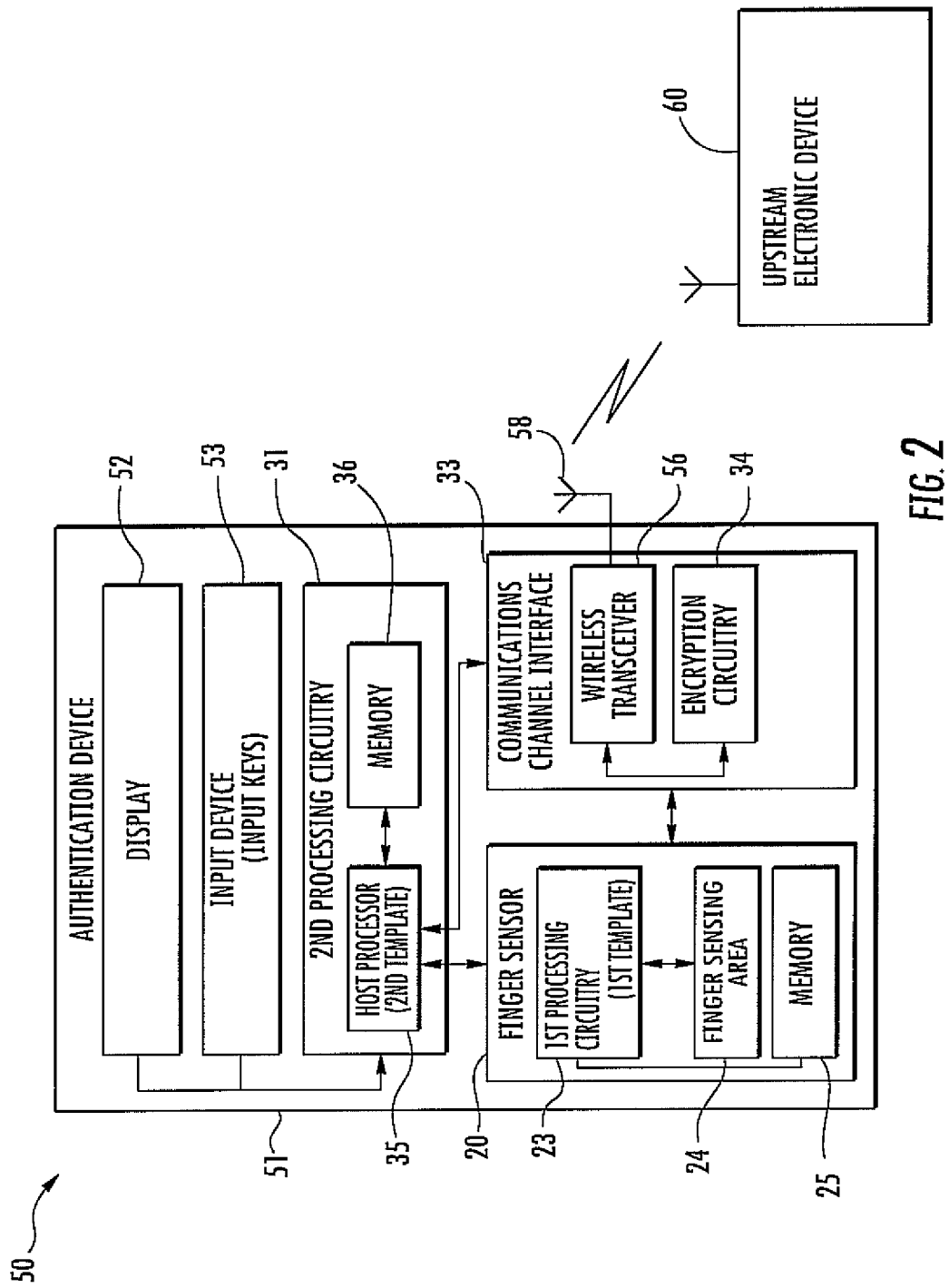
FIG. 2 is a schematic block diagram of the authentication device of FIG. 1 and an upstream electronic device in accordance with the present invention.

Referring initially to FIGS. 1 and 2, an embodiment of an authentication device 50 in accordance with the present invention is now described. The authentication device 50 is illustratively in the form of a mobile wireless communications device and includes a housing 51, a display 52 carried by the housing, and an array of input keys 54 that may be used for dialing and other applications, for example, as will be appreciated by those skilled in the art. Other input devices may be carried by the housing 51. Of course, in some embodiments, the authentication device 50 may a wired electronic device, for example, a personal computer (PC), and/or may be stationary.

The authentication device 50 also includes a communications channel interface 33 carried by the housing 51. The communications channel interface 33 is illustratively a wireless interface and may include encryption circuitry 34 coupled to a wireless transceiver 56. The wireless transceiver 56 may be configured to perform wireless communications functions, for example, voice and/or data communications. The encryption circuitry 34 may be in the form of a secure access module (SAM), for example, and may encrypt the voice and/or data communications. The communications channel interface 33 may be a wired interface. An antenna 58 is illustratively carried by the housing 51 and is coupled to the wireless transceiver 56.

Figure 3:
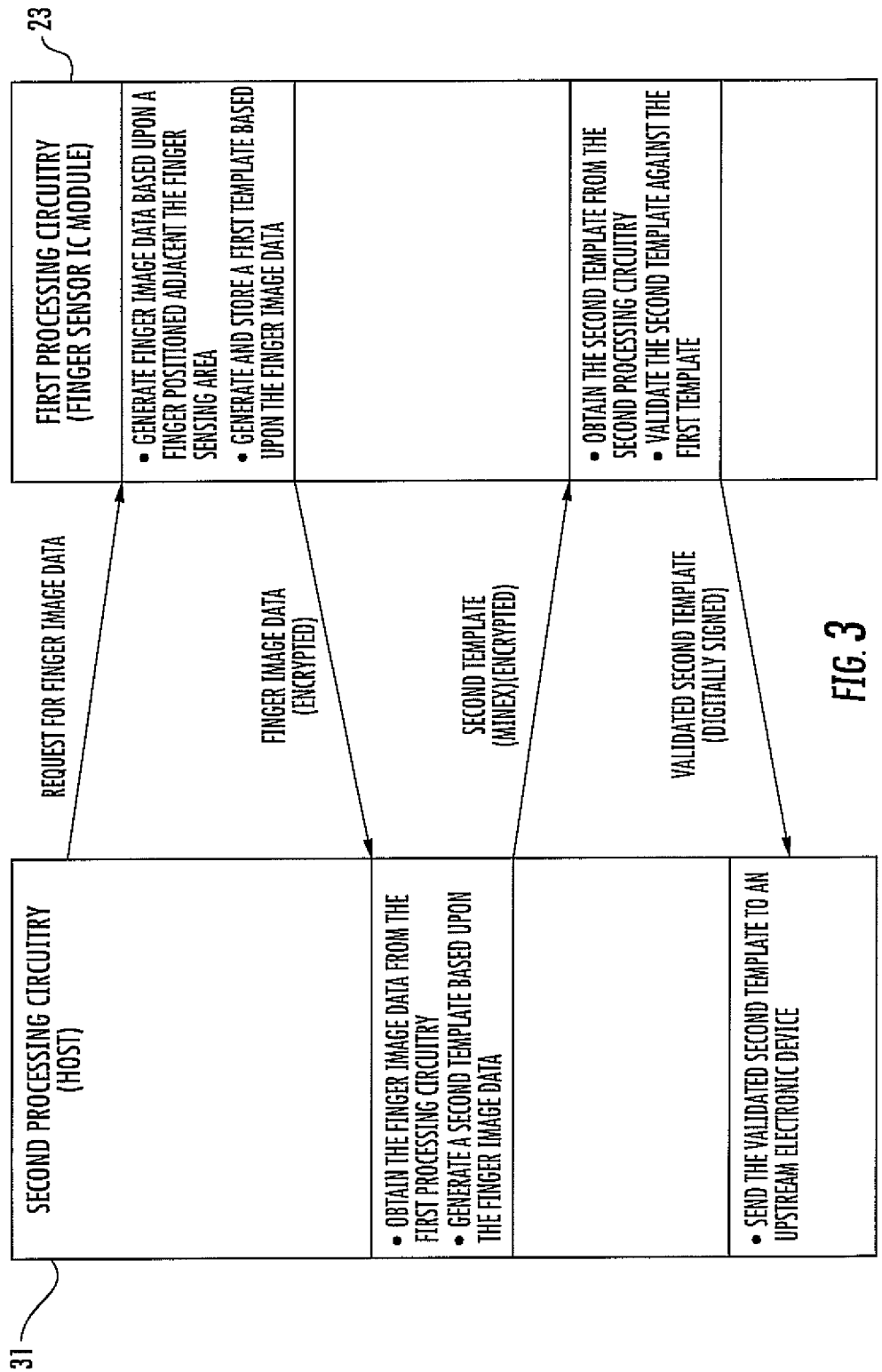
FIG. 3 is a schematic flow diagram of communications between the first and second processing circuitry of the authentication device of FIG. 1.

Referring now additionally to FIG. 3, the authentication device 50 also includes a finger sensor 20 that is illustratively carried by the housing 51. The finger sensor 20 may be in the form of an integrated circuit module, for example, and includes first processing circuitry 23 and a finger sensing area 24 coupled thereto. The finger sensing area 24 is configured to receive a user's finger 61 thereon. The finger sensor 20 may be a slide type sensor, for example, for processing a user's finger as it is slid across the finger sensing area 24. Alternatively, the finger sensor 20 may be a placement type sensor, for example, where the user's finger 61 is statically placed on the finger sensing area 24 for processing. More particularly, the finger sensor 20 may be a fingerprint module based upon a TCS1 or TCS2 FIPS 201 compliant finger sensor available from AuthenTec, Inc. of Melbourne, Fa. Of course, the finger sensor 20 may be another type of finger sensor, for example, the AES series of fingerprint sensors also available from AuthenTec, Inc. of Melbourne, Fla., as will be appreciated by those skilled in the art.

The first processing circuitry 23 is configured to generate finger image data based upon the user's finger 61 being positioned adjacent finger sensing area 24. The first processing circuitry 23 may generate the finger image data also based upon a received initiation command, for example, received from second processing circuitry 31 or host processing circuitry, as will be described in further detail below. The finger image data may be generated based upon ridges and valleys of the user's finger 61. The first processing circuitry 23 is also configured to generate and store a first template based upon the finger image data. The first template may be generated by the processing circuitry 23 by executing a first algorithm that is based upon detected fingerprint minutiae of the user's finger 61. In some embodiments, the first template may be generated by the processing circuitry 23 by executing a first algorithm that is based upon detected fingerprint ridges or ridge flows of the user's finger 61. The first template may be considered a reference template, for example. The first template is illustratively stored in a memory 25, which is coupled to the first processing circuitry 23. The memory 25 may be a secure memory, for example. In some embodiments, different algorithms may be used to generate different templates.

The authentication device 50 further includes second processing circuitry 31 carried by the housing 51 and configured to obtain the finger image data from the first processing circuitry 23. In some embodiments, the finger image data may be encrypted prior to being sent by the first processing circuitry 23 or obtained by the second processing circuitry 31. The second processing circuitry 31 includes a host processor 35, for example, that is coupled to the display 52, the array of input keys 54 or other input device(s), and the communications channel interface 33 including the wireless transceiver 56. The second processing circuitry 31 may communicate with the first processing circuitry 23 over a universal serial bus (USB) interface, a universal asynchronous receive/transmit (DART) interface, or a serial peripheral interface (SPI), as will be appreciated by those skilled in the art. The first and second processing circuitry 23, 31 may communicate with each other over other or additional interfaces.

The second processing circuitry 31 generates a second template also based upon the finger image data. More particularly, the second processing circuitry 31 generates the second template based upon extracted fingerprint minutiae of the user's finger 61. More particularly, the second processing circuitry 31 generates the second template based upon fingerprint minutiae extracted from the fingerprint image data using a second algorithm. The second template may be a Minutiae Interoperability Exchange (MINEX) template and generated based upon a MINEX compliant algorithm stored in the memory 36. In some embodiments, similar to the first processing circuitry 23, the second processing circuitry 31 may generate the second template based upon detected fingerprint ridges or ridge flows of the user's finger 61. Additionally, the second template may be based upon both minutiae and ridge flow, for example. In other words, the finger image data used to generate the second template may be a super set of the finger image data used to generate the first template.

As will be appreciated by those skilled in the art, the MINEX template, for example, may be computationally heavy. In other words, there may be an increased amount of processing associated with a MINEX template, as compared to other templates. In particular, the algorithm generating the first template is computationally light compared to the algorithm generating the second template. Thus, the first processing circuitry 23, which is part of the finger sensor 20, may be smaller in physical size, for example, as compared to the first processing circuitry 23 or host processor 35. However, the first template, or reference template may also be less accurate than the second, or MINEX, template.

The first processing circuitry 23 is also configured to obtain the second template from the second processing circuitry 31, and thereafter validates the second template against the first template. The first processing circuitry 23 may validate the second template against the first template by comparing the templates, for example. Other validation techniques may be used, as will be appreciated by those skilled in the art. For example, validation may be carried out as a classical match between two minutiae template. Alternatively, validation may be carried out by verifying that the two templates are related to a fingerprint with practically the same absolute positioning, for example.

The second processing circuitry 31 sends the second template via the communications channel interface 33, based upon validation of the second template against the first template. In other words, once the first processing circuitry 23 has validated the first template against the second template, i.e., a successful validation, the first processing circuitry sends the second template, i.e., the MINEX template, which may be digitally signed, to the second processing circuitry 31. The second processing circuitry 31 sends the digitally signed second or MINEX template to the communications interface 33 for sending to an upstream electronic device 60, for example.

The encryption circuitry 34 may encrypt the digitally signed second, or MINEX, template prior to sending it to the upstream electronic device 60. The digitally signed second template may be send to the upstream electronic device 60 via a wireless or wired network, for example, the Internet. The upstream electronic device 60 may process the digitally signed second template, for example, for matching or other processing.

As will be appreciated by those skilled in the art, finger image data, for example fingerprints, are typically not protected or secret, and thus little effort may be made to protect fingerprints. Additionally, since fingerprints are typically not protected, neither are the templates that are generated using the finger image data. Thus, it may be increasingly important to validate the finger image data and the generated template, to be sure that the finger image data comes from a live user's finger and is not a spoof, substitution, or tampered version. The first processing circuitry of the finger sensor 20 advantageously validates or authenticates the second template, i.e., the MINEX template, generated by the second processing circuitry 31 of host processor 35, without relying on any specific security of the second processing circuitry. In other words, the authentication device 50 validates that the finger image data comes from a live finger, and that the finger image data has not been tampered with or substituted.

The authentication device 50 may be particularly advantageous for use with authenticating a person to associate with a benefit or service. For example, a person who may not have an identification card, for example, may be entitled to certain benefits, but may have an identification number that is associated with a biometric of the person's finger. The person may wish claim the benefit, but without a physical identification card, for example, verifying the person's identity may be increasingly difficult. The authentication device 50 may be used to verify the authenticity of the person's finger and communicate the authenticated template for verification that the person is entitled to the benefits he or she is seeking. In other words, the authentication device 50 may be particularly useful for reducing fraudulent activity.

A method aspect is directed to an authentication method for an authentication device 50 that includes a housing 51, a finger sensor 20 carried by the housing and including first processing circuitry 23 and a finger sensing area 24 coupled thereto, and second processing circuitry 31 carried by the housing. The method includes generating, via the first processing circuitry 23, finger image data based upon a finger 61 positioned adjacent the finger sensing area 24. The method further includes generating and storing, via the first processing circuitry 23, a first template based upon the finger image data. The method also includes obtaining, via the second processing circuitry 31, the finger image data from the first processing circuitry 23 and generating, via the second processing circuitry, a second template based upon the finger image data. The method further includes obtaining, via the first processing circuitry 23, the second template from the second processing circuitry 31 and validating, via the first processing circuitry, the second template against the first template.

The authentication device 50 may also include circuitry embedded within the finger sensor 20 to provide menu navigation and selection functions, tactile feedback, and/or power up functions as will be appreciated by those skilled in the art. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An authentication device comprising:
    a housing;
    a finger sensor carried by said housing and comprising first processing circuitry and a finger sensing area coupled thereto and configured to
        generate finger image data based upon a finger positioned adjacent said finger sensing area,
        encrypt the finger image data, and
        generate and store a first template based upon the finger image data, the first template including no finger image data; and
    second processing circuitry carried by said housing and configured to
        obtain the encrypted finger image data from said first processing circuitry, and
        generate a second template based upon the encrypted finger image data, the second template including no finger image data,
    said first processing circuitry further configured to
        obtain the second template from said second processing circuitry, and
        validate the second template against the first template.

2. The authentication device of claim 1, further comprising a communications channel interface carried by said housing and coupled to said second processing circuitry; and wherein said second processing circuitry is further configured to send the second template via the communications channel interface based upon validation of the second template against the first template.

3. The authentication device of claim 2, wherein said communications channel interface comprises a wireless transceiver.

4. The authentication device of claim 3, wherein said communications channel interface further comprises encryption circuitry coupled to said wireless transceiver.

5. The authentication device of claim 1, wherein said finger sensor comprises a finger sensing integrated circuit module.

6. The authentication device of claim 1, wherein the first template is less processing intensive than the second template.

7. The authentication device of claim 1, wherein the first template is based upon fingerprint minutiae extracted from the finger image data by said first processing circuitry and the second template is based upon fingerprint minutiae extracted from the finger image data by said second processing circuitry.

8. The authentication device of claim 1, wherein the second template comprises a Minutiae Interoperability Exchange (MINEX) template.

9. The authentication device of claim 1, further comprising at least one input device and a display each carried by said housing; and wherein said second processing circuitry comprises a host processor coupled to said at least one input device and said display.

10. An authentication device comprising:
a housing;
a finger sensor carried by said housing and comprising first processing circuitry and a finger sensing area coupled thereto and configured to
generate fingerprint image data based upon a finger positioned adjacent said finger sensing area,
encrypt the fingerprint image data, and
generate and store a first template based upon fingerprint minutiae extracted from the fingerprint image data using a first algorithm, the first template including no fingerprint image data; and
second processing circuitry carried by said housing and configured to
obtain the encrypted fingerprint image data from said first processing circuitry, and
generate a second template based upon fingerprint minutiae extracted from the encrypted fingerprint image data using a second algorithm, the second template including no fingerprint image data, and the second algorithm being more processing intensive than the first algorithm;
said first processing circuitry further configured to
obtain the second template from said second processing circuitry, and
validate the second template against the first template.

11. The authentication device of claim 10, further comprising a communications channel interface carried by said housing and coupled to said second processing circuitry; and wherein said second processing circuitry is further configured to send the second template via the communications channel interface based upon validation of the second template against the first template.

12. The authentication device of claim 11, wherein said communications channel interface comprises a wireless transceiver.

13. The authentication device of claim 12, wherein said communications channel interface further comprises encryption circuitry coupled to said wireless transceiver.

14. The authentication device of claim 10, wherein said finger sensor comprises a finger sensing integrated circuit module.

15. The authentication device of claim 10, wherein the second template comprises a Minutiae Interoperability Exchange (MINEX) template.

16. An authentication method for an authentication device comprising a housing, a finger sensor carried by the housing and comprising first processing circuitry and a finger sensing area coupled thereto, and second processing circuitry carried by the housing, the method comprising:
generating, via the first processing circuitry, finger image data based upon a finger positioned adjacent the finger sensing area;
encrypting, via the first processing circuitry, the finger image data,
generating and storing, via the first processing circuitry, a first template based upon the finger image data, the first template including no finger image data;
obtaining, via the second processing circuitry, encrypted finger image data from the first processing circuitry;
generating, via the second processing circuitry, a second template based upon the encrypted finger image data, the second template including no finger image data;
obtaining, via the first processing circuitry, the second template from the second processing circuitry; and
validating, via the first processing circuitry, the second template against the first template.

17. The method of claim 16, further comprising sending the second template via a communications channel interface coupled to the second processing circuitry based upon validation of the second template against the first template.

18. The method of claim 17, wherein the communications channel interface comprises a wireless transceiver.

19. The method of claim 18, wherein the communications channel interface further comprises encryption circuitry coupled to the wireless transceiver.

20. The method of claim 16, wherein the finger sensor comprises a finger sensing integrated circuit module.

21. The method of claim 16, wherein the first template is less processing intensive than the second template.

22. The method of claim 16, wherein the first template is based upon fingerprint minutiae and the second template is also based upon fingerprint minutiae.

23. The method of claim 16, wherein the second template comprises a Minutiae Interoperability Exchange (MINEX) template.

* * * * *